(12) United States Patent
Guddeti et al.

(10) Patent No.: US 8,688,883 B2
(45) Date of Patent: Apr. 1, 2014

(54) INCREASING TURBO MODE RESIDENCY OF A PROCESSOR

(75) Inventors: Jayakrishna Guddeti, Bangalore (IN); Binata Bhattacharyya, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 13/227,686

(22) Filed: Sep. 8, 2011

(65) Prior Publication Data

US 2013/0067132 A1 Mar. 14, 2013

(51) Int. Cl.
*G06F 13/24* (2006.01)
*G06F 1/00* (2006.01)

(52) U.S. Cl.
USPC .......................................... 710/260; 713/300

(58) Field of Classification Search
USPC .......................................... 710/260; 713/300
See application file for complete search history.

(56) References Cited

U.S. PATENT DOCUMENTS

| | | | |
|---|---|---|---|
| 5,163,153 A | 11/1992 | Cole et al. |
| 5,283,904 A | 2/1994 | Carson et al. |
| 5,522,087 A | 5/1996 | Hsiang |
| 5,590,341 A | 12/1996 | Matter |
| 5,613,128 A | 3/1997 | Nizar et al. |
| 5,621,250 A | 4/1997 | Kim |
| 5,724,527 A | 3/1998 | Karnik et al. |
| 5,931,950 A | 8/1999 | Hsu |
| 6,178,445 B1 | 1/2001 | Dawkins et al. |
| 6,205,508 B1 | 3/2001 | Bailey et al. |
| 6,665,761 B1 | 12/2003 | Svenkeson et al. |
| 6,687,818 B1 | 2/2004 | Svenkeson et al. |
| 6,748,546 B1 | 6/2004 | Mirov et al. |
| 6,792,392 B1 | 9/2004 | Knight |
| 6,813,665 B2 | 11/2004 | Rankin et al. |
| 6,823,516 B1 | 11/2004 | Cooper |
| 6,829,713 B2 | 12/2004 | Cooper et al. |
| 6,976,099 B2 | 12/2005 | George et al. |
| 6,983,339 B1 | 1/2006 | Rabe et al. |
| 6,996,728 B2 | 2/2006 | Singh |
| 7,010,708 B2 | 3/2006 | Ma |
| 7,039,740 B2 | 5/2006 | Glasco et al. |
| 7,043,649 B2 | 5/2006 | Terrell |
| 7,051,137 B2 | 5/2006 | Poisner |
| 7,089,341 B2 | 8/2006 | Kriegel |
| 7,093,147 B2 | 8/2006 | Farkas et al. |
| 7,111,179 B1 | 9/2006 | Girson et al. |

(Continued)

FOREIGN PATENT DOCUMENTS

EP  1 282 030 A1  5/2003

OTHER PUBLICATIONS

U.S. Appl. No. 12/889,121, "Providing Per Core Voltage and Frequency Control," filed Sep. 23, 2010, by Pakaj Kumar.

(Continued)

*Primary Examiner* — Brian Misiura
(74) *Attorney, Agent, or Firm* — Trop, Pruner & Hu, P.C.

(57) ABSTRACT

In one embodiment, the present invention includes a method for accessing a task stored in an entry of a task queue that identifies the task and a first core of a processor on which the task has been scheduled, reassigning the task to a coldest idle core of the processor, and sending the task to the coldest idle core and maintaining the processor in a turbo mode. Other embodiments are described and claimed.

20 Claims, 7 Drawing Sheets

(56) References Cited

U.S. PATENT DOCUMENTS

| | | | |
|---|---|---|---|
| 7,191,349 B2 | 3/2007 | Kaushik et al. |
| 7,194,643 B2 | 3/2007 | Gonzalez et al. |
| 7,222,203 B2 | 5/2007 | Madukkarumukumana et al. |
| 7,272,730 B1 | 9/2007 | Acquaviva et al. |
| 7,363,394 B2 | 4/2008 | Shen et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,496,706 B2 | 2/2009 | Nguyen et al. |
| 7,529,956 B2 | 5/2009 | Stufflebeam |
| 7,539,885 B2 | 5/2009 | Ma |
| 7,627,706 B2 | 12/2009 | Kaushik et al. |
| 7,730,340 B2 | 6/2010 | Hu et al. |
| 7,769,938 B2 | 8/2010 | Kaushik et al. |
| 7,886,172 B2 | 2/2011 | Bose et al. |
| 8,224,639 B2 * | 7/2012 | Inoue ............................ 703/18 |
| 8,281,308 B1 * | 10/2012 | Cheng et al. .................. 718/100 |
| 2001/0044909 A1 | 11/2001 | Oh et al. |
| 2001/0052043 A1 | 12/2001 | Pawlowski et al. |
| 2002/0124196 A1 | 9/2002 | Morrow et al. |
| 2002/0194509 A1 | 12/2002 | Plante et al. |
| 2003/0061383 A1 | 3/2003 | Zilka |
| 2004/0015628 A1 | 1/2004 | Glasco et al. |
| 2004/0064752 A1 | 4/2004 | Kazachinsky et al. |
| 2004/0088460 A1 | 5/2004 | Poisner |
| 2004/0098560 A1 | 5/2004 | Storvik et al. |
| 2004/0128563 A1 | 7/2004 | Kaushik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0027914 A1 | 2/2005 | Hammalund et al. |
| 2005/0033881 A1 | 2/2005 | Yao |
| 2005/0125580 A1 | 6/2005 | Madukkarumukumana et al. |
| 2005/0132238 A1 | 6/2005 | Nanja |
| 2005/0228918 A1 | 10/2005 | Kriegel |
| 2005/0278520 A1 | 12/2005 | Hirai et al. |
| 2006/0015668 A1 | 1/2006 | Nguyen et al. |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0095911 A1 | 5/2006 | Uemura et al. |
| 2006/0117202 A1 | 6/2006 | Magklis et al. |
| 2006/0184287 A1 | 8/2006 | Belady et al. |
| 2006/0294277 A1 | 12/2006 | Tetrick |
| 2007/0005995 A1 | 1/2007 | Kardach et al. |
| 2007/0016817 A1 | 1/2007 | Albonesi et al. |
| 2007/0067521 A1 | 3/2007 | Shen et al. |
| 2007/0079294 A1 | 4/2007 | Knight |
| 2007/0106827 A1 | 5/2007 | Boatright et al. |
| 2007/0143514 A1 | 6/2007 | Kaushik et al. |
| 2007/0156992 A1 | 7/2007 | Jahagirdar |
| 2007/0157197 A1 | 7/2007 | Neiger et al. |
| 2007/0214342 A1 | 9/2007 | Newburn |
| 2007/0239398 A1 | 10/2007 | Song et al. |
| 2007/0239917 A1 | 10/2007 | Orita et al. |
| 2007/0245163 A1 | 10/2007 | Lu et al. |
| 2008/0028240 A1 | 1/2008 | Arai et al. |
| 2008/0162762 A1 | 7/2008 | Neiger |
| 2008/0250260 A1 * | 10/2008 | Tomita ........................ 713/324 |
| 2009/0006871 A1 | 1/2009 | Liu et al. |
| 2009/0070510 A1 | 3/2009 | Crossland |
| 2009/0070511 A1 | 3/2009 | Kaushik et al. |
| 2009/0070551 A1 | 3/2009 | Kaushik |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172423 A1 * | 7/2009 | Song et al. ..................... 713/300 |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0169609 A1 * | 7/2010 | Finkelstein et al. ............ 712/43 |
| 2010/0191997 A1 | 7/2010 | Dodeja et al. |
| 2011/0138395 A1 | 6/2011 | Wolfe |
| 2011/0154090 A1 | 6/2011 | Dixon et al. |

OTHER PUBLICATIONS

SPEC-Power and Performance, Design Overview V1.10, Standard Performance Information Corp., Oct. 21, 2008, 6 pages.

U.S. Appl. No. 13/070,700, "Obtaining Power Profile Information With Low Overhead," filed Mar. 24, 2011, by Robert Knight.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Technology Journal, "Power and Thermal Management in the Intel Core Duo Processor," May 15, 2006, pp. 109-122.

Intel, "Intel 64 Architecture x2APIC Specification," Sep. 2007, pp. 1-39.

Intel, "Intel 64 and IA-32 Architectures Software Developer's Manual," vol. 3A, Nov. 2007, 1997-2007, cover p. ii, pp. 8-1 to 8-34 and 8-43.

International Searching Authority, "Notification of Transmittal of the International Search Report and the Written Opinion of the International Searching Authority," mailed Dec. 20, 2012, in International application No. PCT/US2012/053740.

* cited by examiner

| Next Job | Original Core | Coolest Core # | Job → Core # Physical Map | APIC_ID Mapping Table | |
|---|---|---|---|---|---|
| Job_1 | Core0 | Core0 | Job_1 → Core0 | Core # | APIC ID |
| | | | | 0 | 0 |
| | | | | 1 | 1 |
| | | | | 2 | 2 |
| | | | | 3 | 3 |
| Job_2 | Core0 | Core3 | Job_2 → Core3 | Core # | APIC ID |
| | | | | 0 | 3 |
| | | | | 1 | 1 |
| | | | | 2 | 2 |
| | | | | 3 | 0 |
| Job_3 | Core0 | Core1 | Job_3 → Core1 | Core # | APIC ID |
| | | | | 0 | 3 |
| | | | | 1 | 0 |
| | | | | 2 | 2 |
| | | | | 3 | 1 |
| Job_4 | Core0 | Core2 | Job_4 → Core2 | Core # | APIC ID |
| | | | | 0 | 3 |
| | | | | 1 | 1 |
| | | | | 2 | 0 |
| | | | | 3 | 2 |
| Job_5 | Core0 | Core0 | Job_5 → Core0 | Core # | APIC ID |
| | | | | 0 | 0 |
| | | | | 1 | 1 |
| | | | | 2 | 3 |
| | | | | 3 | 2 |

250

| Job_1 | APIC_ID_0 |
|---|---|
| Job_2 | APIC_ID_0 |
| Job_3 | APIC_ID_0 |
| Job_4 | APIC_ID_0 |
| Job_5 | APIC_ID_0 |

| Next Job | Original Core | Coolest And (Coldest +1) | Job → Core # Physical Map | APIC_ID Mapping Table | | |
|---|---|---|---|---|---|---|
| Job_1<br>Job_2 | Core0<br>Core1 | Core0<br>Core1 | Job_1 → Core0<br>Job_2 → Core1 | Core # \| APIC ID<br>0 \| 0<br>1 \| 1<br>2 \| 2<br>3 \| 3 | | |
| Job_3<br>Job_4 | Core0<br>Core1 | Core2<br>Core3 | Job_3 → Core2<br>Job_4 → Core3 | Core # \| APIC ID<br>0 \| 3<br>1 \| 2<br>2 \| 0<br>3 \| 1 | | |
| Job_5<br>Job_6 | Core0<br>Core1 | Core0<br>Core1 | Job_5 → Core0<br>Job_6 → Core1 | Core # \| APIC ID<br>0 \| 0<br>1 \| 1<br>2 \| 2<br>3 \| 3 | | |
| Job_7<br>Job_8 | Core0<br>Core1 | Core1<br>Core2 | Job_7 → Core1<br>Job_8 → Core2 | Core # \| APIC ID<br>0 \| 3<br>1 \| 0<br>2 \| 1<br>3 \| 2 | | |
| Job_9<br>Job_10 | Core0<br>Core1 | Core3<br>Core0 | Job_9 → Core3<br>Job_10 → Core0 | Core # \| APIC ID<br>0 \| 1<br>1 \| 2<br>2 \| 3<br>3 \| 0 | | |

| | |
|---|---|
| Job_1 | APIC_ID_0 |
| Job_2 | APIC_ID_1 |
| Job_3 | APIC_ID_0 |
| Job_4 | APIC_ID_1 |
| Job_5 | APIC_ID_0 |
| Job_6 | APIC_ID_1 |
| Job_7 | APIC_ID_0 |
| Job_8 | APIC_ID_1 |
| Job_9 | APIC_ID_0 |
| Job_10 | APIC_ID_1 |

INCREASING TURBO MODE RESIDENCY OF A PROCESSOR

BACKGROUND

Many modern operating systems (OS's) use the Advanced Configuration and Power Interface (ACPI) standard, e.g., Rev. 3.0b, published Oct. 10, 2006, for optimizing system power. An ACPI implementation allows a processor core to be in different power-consumption states, generally referred to as so-called C1 to Cn states. When a core is active, it runs at a so-called C0 state, and when the core is idle it may be placed in a core low power state, a so-called core non-zero C-state (e.g., C1-C6 states).

In addition to power-saving states, performance states or so-called P-states are also provided in ACPI. These performance states may allow control of performance-power levels while a core is in an active (C0) state. In general, multiple P-states may be available, namely from P0-Pn, where P0 corresponds to a maximum rated frequency for the core, while each P-state, e.g., P1-Pn, operates the core at lower performance levels.

Turbo mode is a mechanism that allows one or more cores of a processor to operate at higher than this maximum rated frequency, when there is enough power and thermal budget available. But as the power consumption on a core increases, its thermal dissipation also increases, which makes the core hotter than when it is not running in turbo mode. When a core becomes hotter, a thermal throttling mechanism initiates to reduce thermal dissipation by reducing the frequency of the core. The amount of time a core can be in turbo mode in general thus depends on two factors: (1) base temperature of the core when a job is assigned to it with turbo mode enabled; and (2) time taken to reach the thermal trip point of the thermal throttling mechanism.

BRIEF DESCRIPTION OF THE DRAWINGS

FIG. 2 is an illustration of dynamic reassignment of processor identifiers in accordance with an embodiment of the present invention.

FIG. 3 is another illustration of processor identifier reassignment in accordance with an embodiment of the present invention.

DETAILED DESCRIPTION

Figure 1:
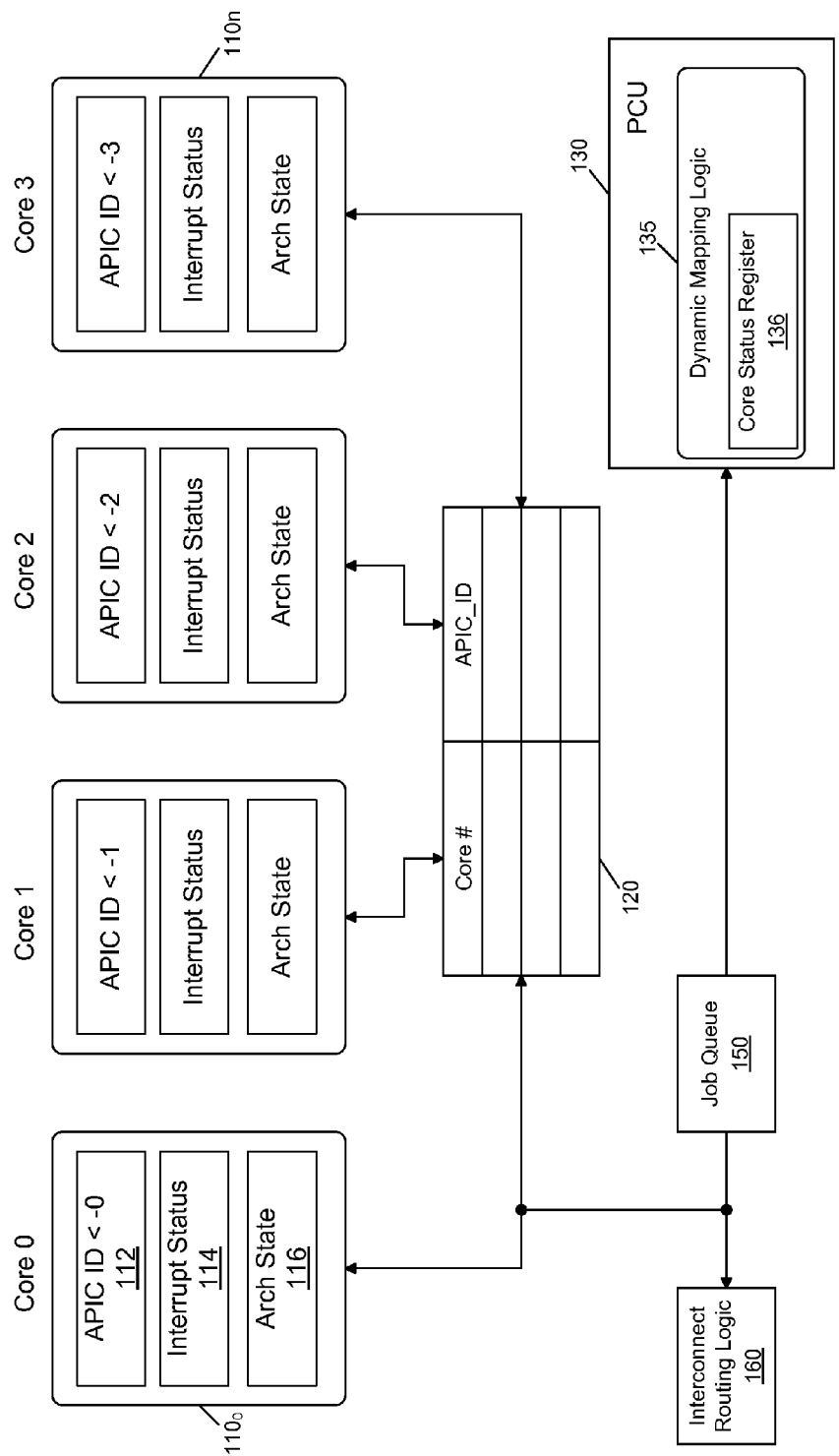
FIG. 1 is a block diagram of a processor in accordance with an embodiment of the present invention.

In various embodiments, a core scheduling mechanism may be provided to select an appropriate core for scheduling of processes and for placement into a turbo mode, e.g., by always selecting a colder core to enter into the turbo mode. In various embodiments, colder core selection can be implemented by processor hardware, in a manner that is not visible to operating system (OS)/application software. As used herein, an active "turbo mode" means an operation mode in which at least one processor domain (e.g., 1 or more cores) is operating at a higher than guaranteed operating frequency. For example, assume a processor has a stamped thermal design power (TDP) frequency of 2.0 gigahertz (GHz). This frequency may correspond to a P1 performance state, namely the maximum guaranteed operating frequency. Instead, in the P0 state, the operating frequency may be higher (depending on other factors such as number of active cores, workload types, thermal budget and so forth). Accordingly, the P0 state is an opportunistic state in which operating frequency can exceed the TDP maximum operating frequency. Assume that a given processor has multiple bins of upside, e.g., 10 bins. As a result, the processor can operate in turbo mode at somewhere from between 2 GHz to 3 GHz, depending when power and thermal budget is available.

A power budget is calculated using how many cores in a given processor are in a low power state (e.g., a C1-state or other low power state according to the ACPI specification) so that the non-used power can be given to active cores to boost frequency and voltage. But unfortunately, active cores dissipate higher amounts of power and thus heat generation increases. This can trigger a thermal throttle mechanism to reduce the heat dissipation, by reducing frequency on active cores. Turbo residency is thus the ratio of amount of time an active core is in turbo mode (assuming power budget is available) and the total time it can be in turbo mode. This ratio is inversely proportional to the amount of heat dissipated in active cores.

In many processors, generally a core-to-advanced programmable interrupt controller (APIC) ID mapping is programmed during reset, e.g., by firmware and it is left unchanged until a next reset. Instead in various embodiments, the APIC ID assignment for each core can be dynamically mapped. To this end, a mapping table, referred to herein as a core-to-APIC ID mapping table, can be provided to store the current APIC ID of each core at a given instance of time. In one embodiment, the table may be of a size equal to the number of cores, and having entries that can be indexed by a core number, which may be a fixed identifier for a core, e.g., stored in a configuration register in interrupt routing logic located outside the core to thus return the current APIC ID assigned to that particular core stored in a corresponding entry.

In various embodiments an algorithm, which can be implemented as a finite state machine (FSM), may be used to choose the APIC ID of a core based on temperature. In one embodiment, there can be specific pre-conditions to be met before dynamically changing the APIC ID of a core, e.g., based on temperature, turbo mode enable, and power budget availability. As an example, the core that is having its APIC ID reassigned can be in a given low power state (e.g., a C-state of C1 or less (minimum one cycle in a halt sleep state)). Once the pre-conditions are met, the FSM can reassign (or swap) the APIC IDs between this core and another core, namely a colder core, to automatically redirect a next job to the colder core instead of an intended hotter core. Thus in various embodiments, a scheduling algorithm implemented, e.g., via hardware logic, may select a colder core always, whenever there is a new job being scheduled and turbo mode budget is available. This algorithm also makes sure at any given point of time there is no repetition of APIC IDs (all are unique).

The current APIC ID of a core might have changed from the time the core entered into a sleep state and when it exits from the sleep state. Hence, C-state exit microcode of the core can be configured to reassign the APIC ID of the core before accepting interrupts. The latest APIC ID will be found in the core-to-APIC ID mapping table and microcode can access the corresponding APIC ID and assign it to the APIC ID register inside the core and then exit from the C-state.

An inter-processor interrupt (IPI) is an interrupt that is sent between different agents in a processor. The logic that routes the IPIs based on a destination APIC ID, namely an interrupt routing logic, can access the core-to-APIC ID table, and based on the current APIC ID assignment, route the interrupt to the correct physical core.

A power management unit may be the logic responsible for placing cores in a selected power state, e.g., into deeper C-states and then waking up the cores. A sleeping core is woken up by the power control logic if that core receives an event (e.g., an interrupt). As embodiments allow the APIC ID to change dynamically, before waking up a particular core, the power control logic can check a core's current APIC ID and wake up the core only if the APIC ID matches the destination of the event.

Referring now to FIG. 1, shown is a block diagram of a processor in accordance with an embodiment of the present invention. As shown in FIG. 1, processor 100 may be a multicore processor including a plurality of cores. Specifically shown in FIG. 1 is a multicore processor including four cores $110_0$-$110_n$. However, the scope of the present invention is not limited in this regard and in other embodiments many more than four such cores may be present. As seen, each core may include an APIC register 112 to store a value corresponding to the current APIC ID for that core. As discussed herein, in various embodiments this APIC ID may dynamically change during operation such that each core may dynamically update its APIC register with updated values during operation. In addition, each core 110 may include an interrupt status register 114 which may provide information regarding its interrupt status, e.g., if there are two interrupts pending in the APIC, two bits in a 256 bit vector (for example) may be set to indicate the pending interrupts. Furthermore, each core may include an architectural state storage 116 which in different embodiments can be one or more register files such as integer and floating point register files, which can be of various sizes, including vector sizes in some embodiments. Such architectural state may further include configuration and status registers for controlling and identifying status of operations performed on the corresponding core. Although shown with these limited amounts of components for ease of illustration in FIG. 1, understand that additional components may be present in various cores, including an execution pipeline which can include front end, execution, and back end stages.

As further seen in FIG. 1, the cores may be coupled to a mapping table 120. More specifically, mapping table 120 may be a core-to-APIC ID mapping table that includes a plurality of entries each to store a core identifier and a corresponding APIC ID. As described herein, the entries in this mapping table can be dynamically updated during processor operation, e.g., by logic of a power control unit 130. More specifically as seen in the embodiment of FIG. 1, power control unit (PCU) 130 may include a dynamic mapping logic 135 that can dynamically update the entries in mapping table 120, e.g., when it is determined that a temperature change has occurred in one or more cores. As further seen, PCU 130 can further include a core status register block 136, which can be used to store a status for each of the corresponding cores. For example, a status indicator for a given core may be set at a first value when the core is active and can receive interrupts, and instead may be set at a second value when a core is in a sleep state.

As further shown in FIG. 1, an interrupt routing logic 160 may further be coupled to PCU 130 and the plurality of cores. And as further seen, a job queue 150 may also be present. Although the scope of the present invention is not limited in this regard, in various embodiments job queue 150 may include multiple entries each to store information regarding jobs to be executed by a given core. In various embodiments, job queue 150 may be populated by an OS or other scheduling logic.

In general, during normal operation, interrupt routing logic 160 may access job queue 150 to select a job for passing to a given core 110, e.g., via an interrupt. However, prior to passing the job to the core, dynamic mapping logic 135 may determine whether an identified core to handle a given job is the most appropriate core from a turbo mode residency maintenance point of view. That is, dynamic mapping logic 135 may determine whether another core is more suitable, e.g., based on temperature, to handle the task to thus potentially maintain processor 100 and its executing cores in a turbo mode for a longer residency. Although shown with these limited components for ease of illustration in FIG. 1, understand that additional components can be present in a processor such as one or more levels of cache memories, additional controllers, thermal sensors (e.g., each associated with a given core to communicate temperature information to PCU 130), other sensors and so forth.

As discussed above, APIC IDs can be dynamically changed, rather than fixing the APIC IDs on system boot up. In one embodiment, an APIC ID of a particular core 110 can be exchanged with another core's APIC ID only if both cores are sleeping and no interrupts are pending in both cores. Power control unit 130 can track active cores and sleeping cores, interrupts seeking to wake up the cores, turbo budget availability, and current temperature of each core. If the intended core to which an interrupt is designated (e.g., according to its current APIC ID) is not colder than other cores, then power control unit 130 may swap the APIC ID of this core with a colder core's APIC ID. To achieve this, power control unit 130 can maintain or access the core-to-APIC ID mapping table 120, indexed by core/thread number and return the current APIC ID being assigned to that particular core. Every time a core wakes up from a sleep state, it accesses its current APIC ID value from the core-to-APIC ID mapping table and assigns it to the APIC ID register, which can be maintained in a core's local APIC.

In addition to the core maintaining its local APIC ID coherent with mapping table 120, interrupt routing logic 160 may track changes in the core-to-APIC ID mapping table and direct the interrupt to the appropriate core based on the current APIC ID mapping. To avoid a race condition between power control unit 130 updating core-to-APIC ID mapping table 120 and other agents (e.g., cores, interrupt router logic or others) using the table for determining a current mapping, mapping table 120 can be locked by power control unit 130 prior to update, and during this update no other agent can access the table.

If the core is already active (e.g., as determined with reference to core status register 136), then interrupt routing logic 160 need not access the core-to-APIC ID table, and can directly route the interrupt to the corresponding core. When a core is sleeping and being woken up responsive to an interrupt, both power control unit 130 and interrupt routing logic 160 can determine the current APIC ID of the core. Note that power control unit 130 can change the APIC ID if needed and interrupt routing logic 160 then obtains the updated version of the APIC ID from the core-to-APIC ID map and delivers the interrupt to the correct core.

Referring now to FIG. 2, shown is an illustration of dynamic reassignment of APIC IDs in accordance with an embodiment of the present invention. More specifically, FIG.

2 shows a task or job queue 200 that includes multiple entries, each corresponding to a given task or job and a corresponding APIC ID for a core on which the task is scheduled, e.g., by scheduling logic of an OS or other software. Although the scheduling logic of the OS or other scheduling entity that loads entries into the job queue uses APIC IDs to identify cores, in other embodiments another type of core identifier such as core number can be used. As seen in FIG. 2, job queue 200 includes 5 jobs that are running sequentially one after another due to application level dependencies. As seen, queue 200 thus identifies that these multiple tasks are all assigned to the same core by associating the same APIC ID with each task. In this case, if turbo mode is enabled then the power control unit places the core in turbo mode due to the fact that there is enough turbo power budget available, as other cores are sleeping. However as discussed above, such assignment, if executed by interrupt routing logic can cause the temperature of the single core to undesirably increase as these multiple jobs get assigned to the same core, which can prevent or limit residency in a turbo mode, since as that core becomes hotter, its frequency can be demoted (causing it to exit turbo mode).

Instead by scheduling as described herein, each job will always find a colder core at any given point of time, as the APIC_ID #0 will be assigned to a colder core, dynamically. In some embodiments, there may be at least one halt instruction between subsequent jobs, so that the current core enters into a C-state (minimum halt) to allow the hardware algorithm to swap APIC IDs if required. The halt instruction may be introduced between a first job and a second job by microcode of the core per a request from the power control unit. Or such instruction can be inserted by a job scheduler of the operating system or application software during compilation. Accordingly, as further seen in FIG. 2, a table shows reassignment of APIC IDs in accordance with an embodiment of the present invention is present. Specifically, table 250 in FIG. 2 shows a sequence of events that occur when each new job is taken from the job queue and the corresponding APIC ID is mapped. Job_1, which is the first job in the queue, is scheduled on Core 0. Job_2, which is the second job originally intended for Core 0, is scheduled on Core 3 as Core 3 is the colder core in this example. To accommodate this assignment to this core (Core3), the core-to-APIC_ID mapping table is modified by swapping APIC IDs of Core 3 and Core 0. As noted before, this swap may be performed when both cores are in a sleep/halt state. Similar swapping of APIC IDs can occur for Job_3, Job_4 and Job_5.

Referring now to FIG. 3, shown is another illustration of APIC ID reassignments in accordance with an embodiment of the present invention. As shown in FIG. 3, a job queue 200' includes multiple entries. However, according to a scheduling algorithm for this embodiment, two jobs can be scheduled at the same time, namely to two different cores represented by two different APIC IDs. Thus as seen in the job queue 200', each pair of jobs that are to execute at the same time are assigned to a pair of processors represented by APIC IDs 0 and 1. Thus FIG. 3 describes a scenario in which two jobs can be scheduled at the same time, allowing the two cores to run in turbo mode at the same time. As seen in table 250' in FIG. 3, reassignments can be performed based on the coldest core and the next coldest core (i.e., coldest and coldest+1). Thus as seen, at each stage of processing, up to four different core-to-APIC ID mapping entries can be updated to allow the jobs to be executed, at each stage, on the coldest and next coldest cores.

Table 1 describes an algorithm used for changing/swapping APIC ID in accordance with an embodiment of the present invention, and lists various preconditions to be met and corresponding actions.

TABLE 1

| Core APIC ID Change Algorithm |  |
| --- | --- |
| If | New_IPI_to_coreA |
|  | and Another_sleeping_coreB_is_Coldest |
|  | and Turbo_budget_available |
|  | and Turbo_enabled |
|  | and CoreA_temperature > (CoreB_temperature+GB) |
| Then | Swap APIC IDs of CoreA and CoreB |
|  | Update Core > APIC ID table |
|  | Allow regular flow |
| End |  |

The example algorithm of Table 1 considers that Core A is the core to which an interrupt/job is intended and Core B is a colder core at that given point of time. In this example, the preconditions for APIC ID swapping are as follows: Core A is currently in a sleep state and an IPI is waiting for Core A; there exists another sleeping core (e.g., Core B) that is colder than Core A, where the Core A temperature is greater than the Core B temperature by a programmable amount, e.g., a guard band (which prevents reassignments when the cores' temperatures are within a threshold amount of each other (e.g., if the difference in temperature between two cores is less than 10%)); the turbo mode budget in terms of power and thermal is available; and turbo mode is enabled on the processor. Assuming that these preconditions have been met, the PCU may then perform the following operations: swap the APIC IDs of CoreA and CoreB, and update the Core-to-APIC ID table accordingly. Thereafter, normal operations to assign the next job to the identified core can occur. Such operations can include determining whether the core is awake (which here it is not if a remapping has occurred); triggering an interrupt to wake up the core (which will cause execution of a wakeup state machine on the core); and responsive to the core being ready to accept the job, triggering an interrupt to send the job to the core.

Typical processors do not have any mechanism to increase turbo residency beyond the thermal budget available and even if a core is at higher temperature, that particular core can be placed into turbo mode (as software/operating system targeted the job to a hotter core). However, due to the thermal trigger mechanism, this turbo mode residency can be of limited duration.

Instead in various embodiments, by always selecting a colder core to assign a job/task/interrupt, a longer residency in turbo mode can be realized before reaching a thermal throttle temperature point. In various embodiments, the mechanism can be implemented in processor hardware (e.g., within the PCU) and the operating system is unaware of it. In other implementations, an OS/application may be aware of this mechanism, but with no change to the operating system/application. In this way, APIC IDs of the cores can be dynamically changed when the core is exiting from any sleep state (to operate at a turbo mode frequency), in a manner transparent to operating system/application. As a result, increased residency in turbo mode can be realized, irrespective of operating system schedule policy (whether it schedules on same core always or not). And, by using this processor hardware to schedule tasks to colder cores, a reduced amount of heat dissipation or normalized heat distribution is realized, extending processor lifetime. Also the reduced occurrence of the processor reaching a peak temperature enables thermal/cooling solutions to be cheaper/reliable.

Figure 4:
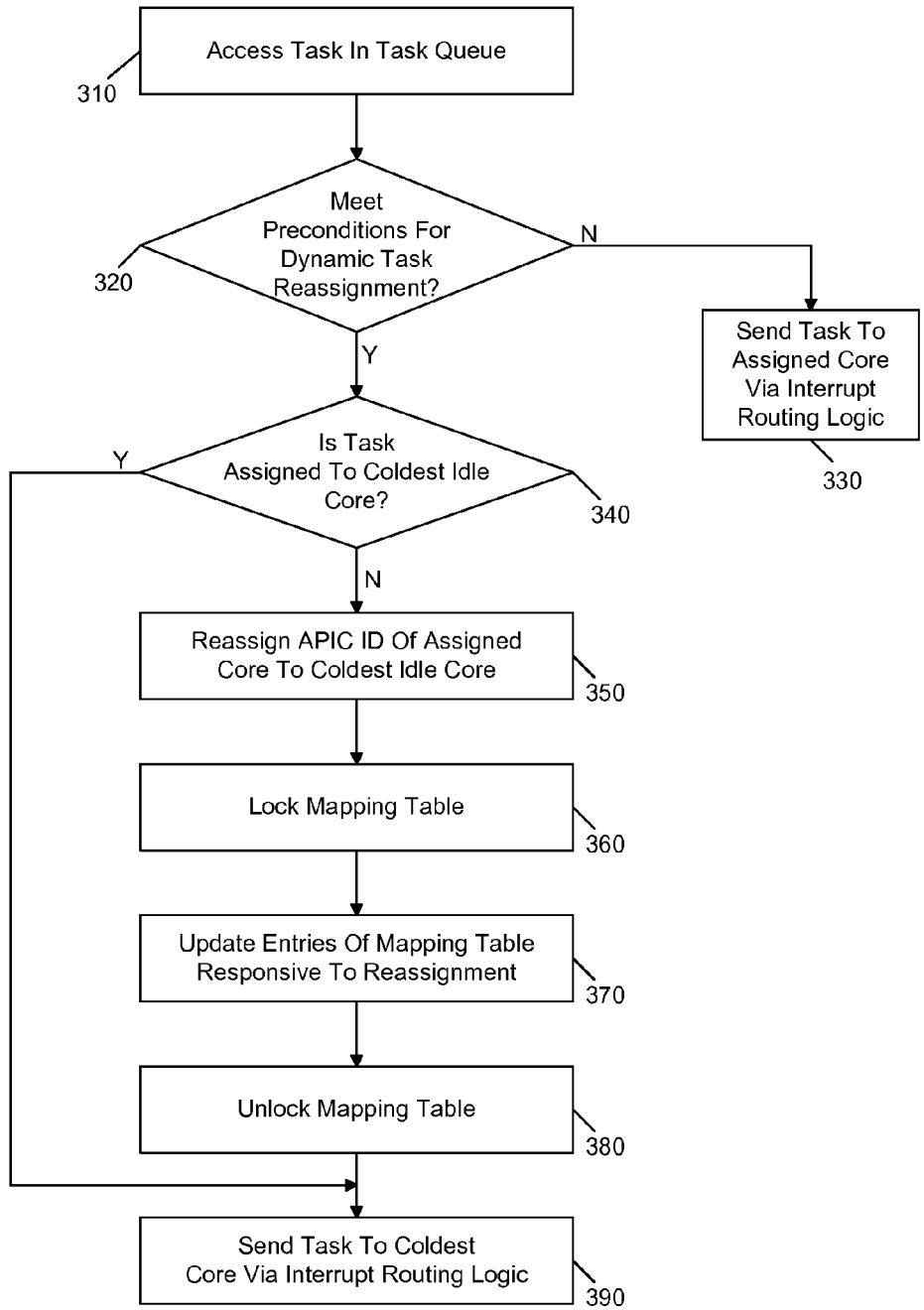
FIG. 4 is a flow diagram of a method of dynamic identifier reallocation in accordance with an embodiment of the present invention.

Referring now to FIG. 4, shown is a flow diagram of a method of dynamic identifier reallocation in accordance with an embodiment of the present invention. As shown in FIG. 4, method 300 may be implemented within a power control unit, such as within dynamic mapping logic of a PCU. As seen in FIG. 4, method 300 may begin by accessing a task in a task queue (block 310). In one embodiment, the dynamic mapping logic may access the entry at a head of the queue, where the queue is arranged as a first-in-first-out (FIFO) buffer. Next it can be determined whether preconditions have been met for dynamic task reassignment (diamond 320). Although different measures or preconditions can be established in different embodiments, as some examples the preconditions may include whether at least several cores are in a low power state, that turbo mode is enabled, and has headroom available. If not, control passes to block 330 where the task can be sent to the assigned core. In one embodiment, this sending along of a task may be via an interrupt generated by interrupt control logic. Thus according to block 330, if the preconditions are not met a job can be passed to the scheduled core without any reassignment performed, and thus the core having the APIC ID assigned by the OS receives the task.

If instead at diamond 320 it is determined that the preconditions have been met, control passes to diamond 340 where it can be determined whether the task is assigned to the coldest idle core. If so, control passes to block 390 where the task can be sent to its original assigned core, namely the coldest core, e.g., via the interrupt routing logic.

Otherwise, if it is determined that the task is not assigned to the coldest core (and in some embodiments, that another idle core is cooler than the currently identified core by at least a threshold or guard band amount), control passes to block 350. At block 350 the APIC ID of the assigned core can be reassigned to the coldest idle core. To this end, control passes to block 360 to first lock the mapping table that includes the core-to-APIC ID mappings to thus prevent other entities such as cores or interrupt routing logic from accessing the table during updates. Then control passes to block 370 where multiple entries of the table may be updated responsive to the reassignment. For example, assume a first entry associates an APIC ID of 0 with a Core 0 and an APIC ID 1 with a Core 1. Assume that reassignment is to occur such that a job scheduled to APIC ID 0 (and thus Core 0) is to be reassigned to Core 1 given its cooler temperature. Thus, the core identifiers for these two entries of the mapping table can be updated accordingly. Then control passes to block 380 where the mapping table can be unlocked so that other entities can again access the table. Accordingly, control passes to block 390, discussed above. Although shown with this particular implementation in the embodiment of FIG. 4, understand the scope of the present invention is not limited in this regard.

Figure 5:
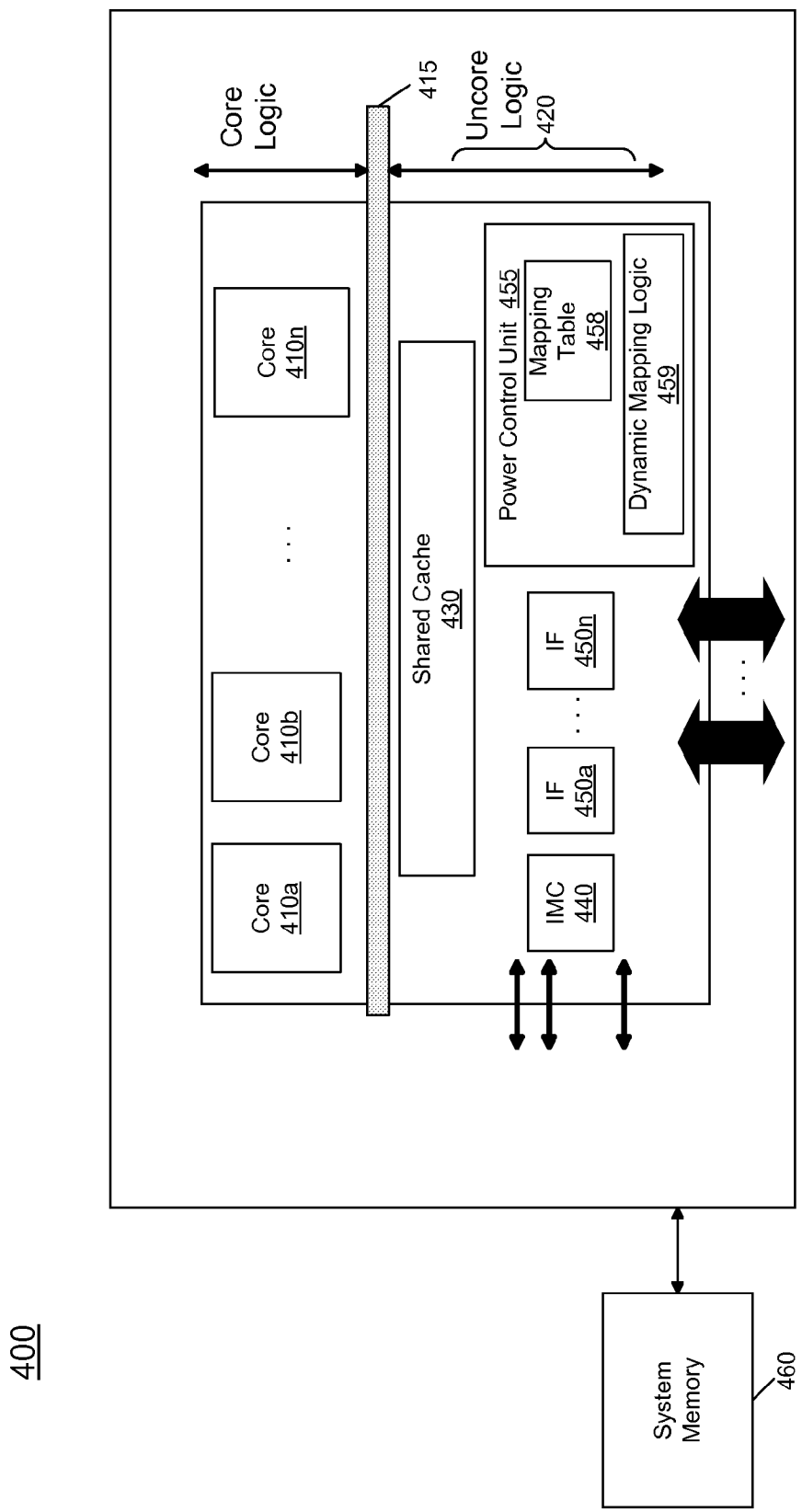
FIG. 5 is a block diagram of a processor in accordance with an embodiment of the present invention.

Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be configured to operate at multiple voltages and/or frequencies, and to enter turbo mode as instructed. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In the embodiment of FIG. 5, PCU 455 may include a mapping table 458 and dynamic mapping logic 459, as described above.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
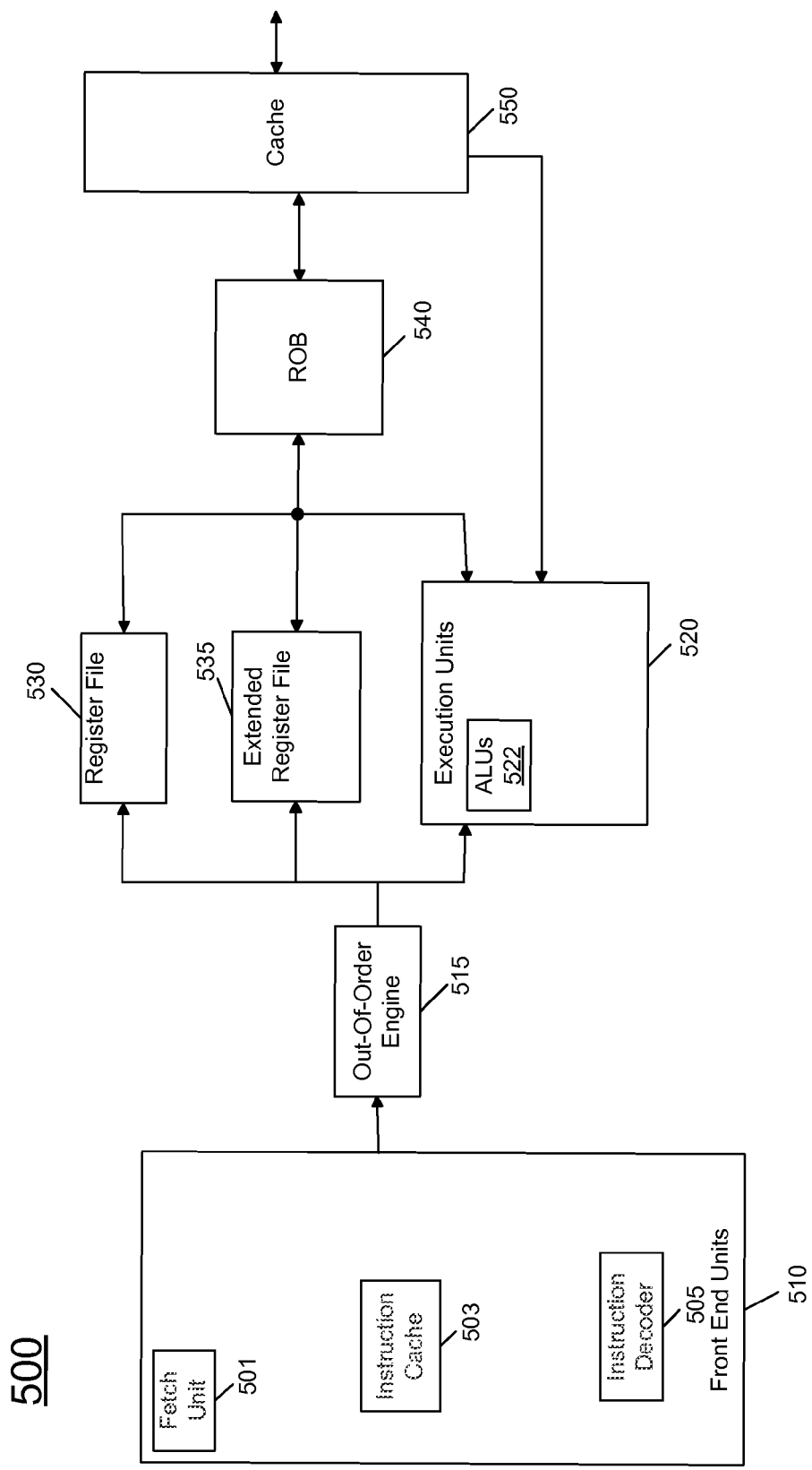
FIG. 6 is a block diagram of a processor core in accordance with one embodiment of the present invention.

Referring now to FIG. 6, shown is a block diagram of a processor core in accordance with one embodiment of the present invention. As shown in FIG. 6, processor core 500 may be a multi-stage pipelined out-of-order processor, and may operate at different voltages and frequencies (both in and out of turbo mode). As seen in FIG. 6, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 6, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 6, understand the scope of the present invention is not limited in this regard. For example, while the implementation of FIG. 6 is with regard to an out-of-order machine such as of a so-called x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 7:
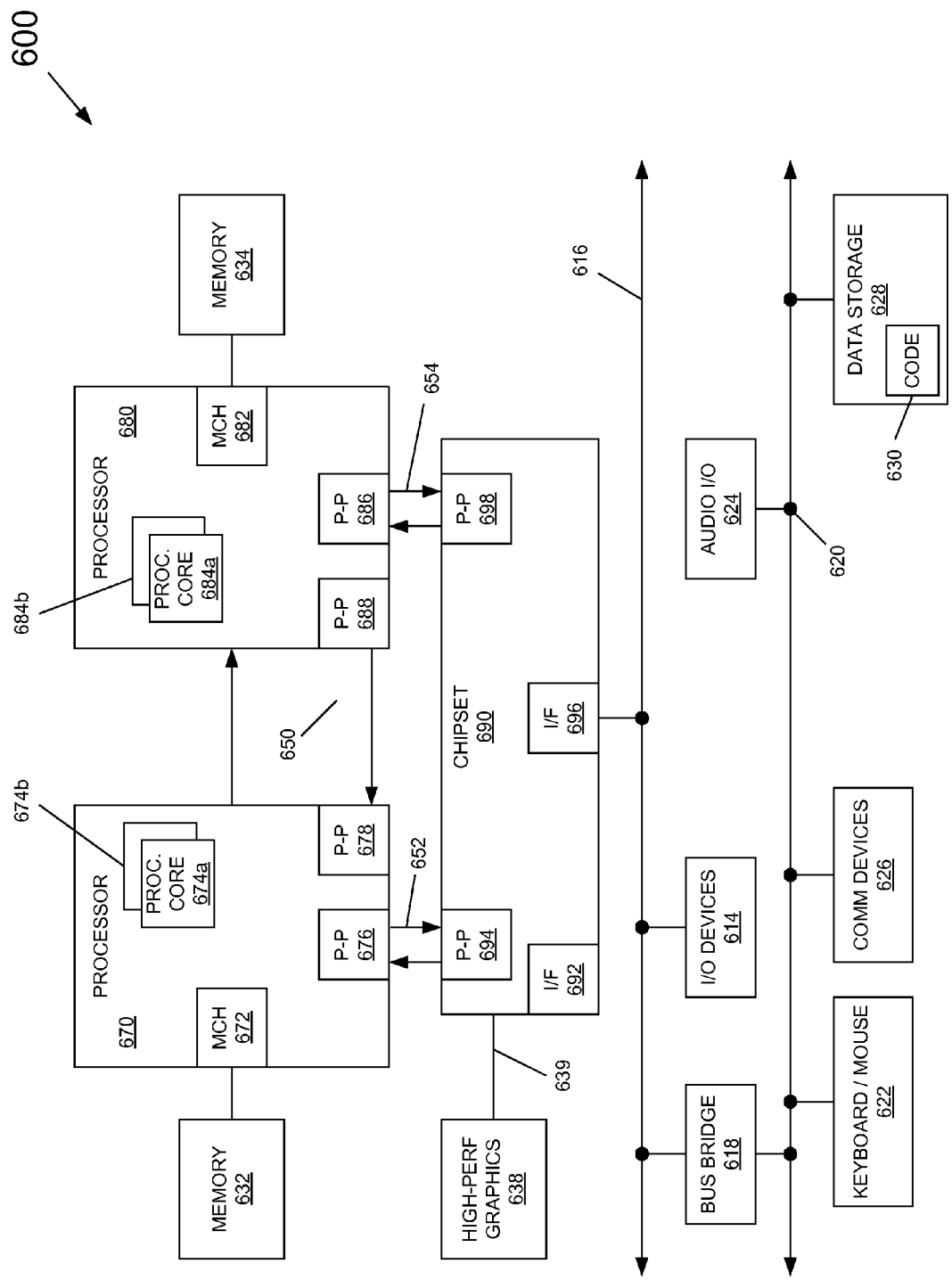
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Each of the cores of the processors can be controlled to have dynamic mappings to APIC IDs, enabling scheduling of jobs to a then current coolest core, to enable longer residency in turbo mode.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a plurality of cores each to execute instructions;
   a mapping table including a plurality of entries each to store a mapping of an advanced programmable interrupt controller (APIC) identifier (ID) to a core of the plurality of cores; and
   a power control unit (PCU) coupled to the plurality of cores and the mapping table and to access a task queue including a plurality of entries each to store a task identifier for a task and a corresponding identifier for a core on which the task is scheduled, wherein the PCU is to reassign a first task obtained from the task queue from a first core to a second core.

2. The apparatus of claim 1, wherein the PCU is reassign the first task based at least in part on a temperature of the first and second cores.

3. The apparatus of claim 2, wherein the second core is cooler than the first core.

4. The apparatus of claim 1, wherein the PCU is to reassign the first task in a manner that is not visible to an operating system.

5. The apparatus of claim 1, further comprising a plurality of thermal sensors each associated with one of the plurality of cores, wherein each of the plurality of thermal sensors is to communicate temperature information to the PCU.

6. The apparatus of claim 1, wherein the second core includes an APIC register to store the APIC ID corresponding to the second core, wherein the second core is to access the mapping table upon exit from a sleep state and to update the APIC register based on the mapping table entry for the second core.

7. The apparatus of claim 1, wherein the PCU is to update first and second entries of the mapping table responsive to the reassignment to swap a first APIC ID associated with the first core with a second APIC ID associated with the second core.

8. The apparatus of claim 7, wherein the PCU is to enable the second core to execute the first task in a turbo mode.

9. The apparatus of claim 8, wherein the first and second cores are in a low power state prior to the reassignment, and the second core is cooler than the first core.

10. The apparatus of claim 9, further comprising interrupt routing logic to access the mapping table and to send an interrupt corresponding to the first task to the second core.

11. The apparatus of claim 7, wherein the PCU is to lock the mapping table prior to update of the first and second entries of the mapping table, wherein the first and second cores are prevented from accessing the mapping table when locked.

12. A method comprising:
   accessing, by first logic of a power control unit (PCU) of a processor, a task stored in an entry of a task queue that identifies the task and a first core of the processor on which the task has been scheduled by a scheduling agent;
   reassigning the task to a coldest idle core of a plurality of cores of the processor if the first core has a temperature greater than a temperature of the coldest idle core by at least a guard band; and
   if so, sending the task to the coldest idle core and maintaining the processor in a turbo mode, and otherwise not reassigning the task.

13. The method of claim 12, wherein reassigning the task includes updating a first entry and a second entry of a mapping table to assign a first advanced programmable interrupt controller (APIC) identifier (ID) previously associated with the first core to the coldest idle core, and to assign a second APIC ID previously associated with the coldest idle core to the first core.

14. The method of claim 13, further comprising sending the task to coldest idle core via an interrupt routing logic.

15. The method of claim 14, further comprising locking the mapping table before updating the first and second entries of the mapping table, and unlocking the mapping table after updating the first and second entries.

16. The method of claim 15, further comprising preventing the interrupt routing logic and the plurality of cores from accessing the mapping table when the mapping table is locked.

17. A processor comprising:
a plurality of cores each to execute instructions of one or more tasks; and
a power control unit (PCU) coupled to the plurality of cores and including a dynamic mapping logic to dynamically map core identifiers of a first core and a second core of the plurality of cores to advanced programmable interrupt controller (APIC) identifiers (IDs) based at least in part on a temperature associated with the first core and the second core, to cause a task scheduled to be executed by the first core to be executed by the second core when a temperature of the first core is greater than a temperature of the second core by at least a threshold amount.

18. The processor of claim 17, further comprising:
a mapping table including a first plurality of entries each to store an association of an APIC ID to a core identifier of the plurality of cores; and
a task queue including a second plurality of entries each to store a task identifier for a task and a corresponding APIC ID for a core on which the task is scheduled, wherein the PCU is to reassign a first task obtained from the task queue from a first core to a second core via the dynamic mapping.

19. The processor of claim 18, further comprising interrupt routing logic to send the first task to the second core based on an updated entry in the mapping table that associates the core identifier for the second core with the APIC ID stored in the entry of the task queue associated with the first task.

20. The processor of claim 17, wherein the second core is to execute a halt instruction following the task to cause the second core to enter into a halt state to enable the dynamic mapping logic to dynamically map the core identifiers prior to execution of a second task.

* * * * *